United States Patent
Berstis et al.

(10) Patent No.: US 7,173,882 B2
(45) Date of Patent: *Feb. 6, 2007

(54) METHODS AND SYSTEMS FOR PERFORMING HOROLOGICAL FUNCTIONS USING TIME CELLS

(75) Inventors: Viktors Berstis, Austin, TX (US); Peter Juergen Klim, Austin, TX (US); Chung Lam, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/059,279

(22) Filed: Feb. 15, 2005

(65) Prior Publication Data

US 2005/0185515 A1    Aug. 25, 2005

Related U.S. Application Data

(63) Continuation of application No. 09/703,344, filed on Oct. 31, 2000, now Pat. No. 6,856,581.

(51) Int. Cl.
G04F 8/00 (2006.01)
G04F 10/00 (2006.01)
G01R 31/26 (2006.01)
H01L 25/00 (2006.01)

(52) U.S. Cl. ............... 368/108; 368/121; 257/E29.309; 324/719; 327/566

(58) Field of Classification Search ........ 368/107–109, 368/113, 114, 121, 155; 257/E29.309; 324/719; 327/566

See application file for complete search history.

(56) References Cited

U.S. PATENT DOCUMENTS

| 4,442,363 A | 4/1984 | Suzuki ............... 307/141.4 |
| 4,995,019 A | 2/1991 | Begin ............... 368/117 |
| 5,195,061 A | 3/1993 | Curtis ............... 369/9 |
| 5,323,066 A | 6/1994 | Feddeler et al. ............ 327/142 |

(Continued)

FOREIGN PATENT DOCUMENTS

JP          04-294292         10/1992

(Continued)

OTHER PUBLICATIONS

B. Prince, *Semiconductor Memories: A Handbook of Design, Manufacture, and Application*, 2nd edition, John Wyley & Sons, pp. 182-187, Jul. 1996.

(Continued)

*Primary Examiner*—Vit W. Miska
(74) *Attorney, Agent, or Firm*—Joseph R. Burwell; Jeffrey S. LaBaw

(57) ABSTRACT

A simple electronic horological device, termed a time cell, is presented with associated methods, systems, and computer program products. A time cell has an insulated, charge storage element that receives an electrostatic charge through its insulating medium, i.e. it is programmed. Over time, the charge storage element then loses the electrostatic charge through its insulating medium. Given the reduction of the electric potential of the programmed charge storage element at a substantially known discharge rate, and by observing the electric potential of the programmed charge storage element at a given point in time, an elapsed time period can be determined. Thus, the time cell is able to measure an elapsed time period without a continuous power source.

20 Claims, 7 Drawing Sheets

U.S. PATENT DOCUMENTS

| | | | |
|---|---|---|---|
| 5,374,904 A | 12/1994 | Ishibashi | 331/17 |
| RE35,043 E | 9/1995 | Takeda | 368/205 |
| 5,463,579 A * | 10/1995 | Shimoji | 365/185.16 |
| 5,485,429 A * | 1/1996 | Ono | 365/222 |
| 5,500,834 A | 3/1996 | Sakaki et al. | 368/9 |
| 5,760,644 A | 6/1998 | Lancaster et al. | 327/566 |
| 6,006,304 A * | 12/1999 | Mukai et al. | 711/103 |
| 6,067,244 A | 5/2000 | Ma et al. | 365/145 |

FOREIGN PATENT DOCUMENTS

| | | |
|---|---|---|
| JP | 09-127271 | 5/1997 |
| JP | 10-189780 | 7/1998 |
| WO | WO 01/17025 A1 | 3/2001 |

OTHER PUBLICATIONS

Weinberg, "On tunneling in metal-oxide-silicon structures", *J. Appl. Phys.*, v. 53, n. 7, pp. 5052-5056, Jul. 1982.

Amin, "Design, selection, and implementation of flash erase EEPROM memory cells", *IEE Proceedings-G*, v. 139, n. 3, pp. 370-376, Jun. 1992.

Forbes, "Use of a spreadsheet for Fowler-Nordheim equation calculations", *J. Vac. Sci. Technol, B*, v. 17, n. 2, pp. 534-541, Mar./Apr. 1999.

Lenzlinger et al., "Fowler-Nordheim Tunneling into Thermally Grown $SiO_2$", *J. Appl. Phys.*, v. 40, n. 1, pp. 278-283, Jan. 1969.

Masuoka et al., "Reviews and Prospects of Non-Volatile Semiconductor Memories", *IEICE Transactions*, v. E 74, n. 4, Apr. 1991.

Masuoka et al., "Flash Memories, Their Status and Trends", *Proceedings of 4th Intl. Conf. on Solid-State and Integrated Circuit Technology*, pp. 128-132, Oct. 1995.

Chi et al., "True Low-Voltage Flash Memory Operations", *Proceedings of 1996 Intl. Nonvolatile Memory Technology Conference*, pp. 94-98, Apr. 1996.

* cited by examiner

METHODS AND SYSTEMS FOR PERFORMING HOROLOGICAL FUNCTIONS USING TIME CELLS

CROSS-REFERENCE TO RELATED APPLICATIONS AND PATENTS

The present patent application is related to the following co-pending patent application and hereby claims priority as a continuation application: U.S. patent application Ser. No. 09/703,344, filed Oct. 31, 2000 now U.S. Pat. No. 6,856,581, titled "Batteryless, Oscillatorless, Binary Time Cell Usable as an Horological Device with Associated Programming Methods and Devices", which has a common assignee with the present patent application and is herein incorporated by reference.

The present application is related to the following patents, which have a common assignee with the present application and are herein incorporated by reference: U.S. Pat. No. 6,831,879, issued Dec. 14, 2004, titled "Batteryless, Oscillatorless, Analog Time Cell Usable as an Horological Device with Associated Programming Methods and Devices"; U.S. Pat. No. 6,829,200, issued Dec. 7, 2004, titled "Sensing Methods and Devices for a Batteryless, Oscillatorless, Binary Time Cell Usable as an Horological Device"; U.S. Pat. No. 6,826,128, issued Nov. 30, 2004, titled "Sensing Methods and Devices for a Batteryless, Oscillatorless, Analog Time Cell Usable as an Horological Device".

BACKGROUND OF THE INVENTION

1. Field of the Invention

The present invention relates to horology and, in particular, to methods and devices for time measurement using an electrical time base. More particularly, the present invention relies on the operation of a device, which may be a solid-state device, with methods and systems pertaining thereto, for measuring time without an oscillator, oscillating element, or oscillating circuit and without a continuous power source. Still more particularly, the present invention is directed to accomplishing commercial transactions in manners that employ said device for its unique horological characteristics.

2. Description of Related Art

Portable electronic devices have become ubiquitous, and as the size and cost of electronic circuits continues to be reduced, electronic devices continue to be incorporated in an increasing number of consumer products. As an example, paper greeting cards that play music when opened are no longer considered a novelty. Technical progress has been made on flexible circuits that will allow electronic circuits to created in a variety of shapes and to be embedded into more products.

Inexpensive electronic devices can be categorized based upon their power requirements or associated power systems. Some electronic devices have a variety of functions that may require the device to be powered by an external power source, such as an electrical outlet via an AC-DC adapter, while some devices require one or more batteries. Other devices may require both types of power sources: an external power source for enabling most functions, and a small battery for powering minor functions, such as a clock or timekeeping function, while not connected to an external power source or while "turned off". Small electronic devices frequently incorporate a small, flat battery, similar to those that power electronic watches, merely to power a clock circuit. Generally, the battery powers some type of time base oscillator or pulse generator that measures the passage of units of time.

The incorporation of a battery into an electronic device solely for a simple clock function creates several disadvantages. Chemical batteries present potential chemical leak and disposal hazards and are relatively expensive compared to the cost of fabricating a tiny electronic circuit. Batteries tend to have a short shelf life, especially compared to the useful life of the electronic circuits that they accompany. In addition, batteries are sometimes several times larger than the electronic circuit to which they are connected, thereby placing design restrictions on the electronic device.

Electronic time base oscillators are assumed to be necessary for small, electronic, horological devices, but the accompanying batteries have many inherent disadvantages. Hence, typical technology constrains the conception of other devices, consumer products, or consumer services that might incorporate a time measurement function.

The patents that are referenced hereinabove provide an advancement of electronic horological technology by introducing a time cell, which is a simple, electronic, horological device that acts as an electrostatic hourglass. In general, an insulated, charge storage element is charged, which gives the charge storage element a known electric potential with respect to points outside its insulating medium. Over a period of time, the charge storage element then discharges the electrostatic charge through its insulating medium through some type of physical process, thereby reducing the electric potential of the charge storage element. At a given point in time, the electric potential of the charge storage element is observed, either directly or indirectly. By knowing the beginning electric potential of the charge storage element, the observed electric potential at the given point in time, and the discharge rate of the charge storage element, an elapsed time period can be determined for a given point in time.

A time cell has many physical advantages over other types of electronic clocks, particularly with respect to the battery issue that is noted above. In contrast to typical horological technology, a time cell provides electronic time measurement without a continuous energy source, such as a battery or an AC or DC power supply. Moreover, a time cell provides electronic time measurement without an oscillator, an oscillating circuit, a beat or pulse counter, or any other type of electric time base oscillator. Hence, a time cell is a small timekeeping device that is hermetically sealed and essentially impervious to external physical effects except extreme temperatures and extreme radiation. As such, a time cell has a small size, a simple fabrication, and a low unit cost.

Although a time cell has an inherent disadvantage because the time cell itself does not have an externally perceivable indicator, in which case a human cannot directly observe and interpret an indicator for an elapsed time period as measured by the time cell, a time cell is still useful for many applications or products in which a display of the timekeeping substance or device is not necessary. The present patent application is directed to various manners of employing time cells to perform horological functions within commercial transactions, wherein multiple embodiments employ time cells in different ways to capture the multiple advantages that are provided by the unique horological characteristics of a time cell.

SUMMARY OF THE INVENTION

A simple electronic horological device, termed a time cell, is presented with associated methods, systems, and computer program products. A time cell has an insulated, charge storage element that receives an electrostatic charge through its insulating medium, i.e. it is programmed. Over time, the charge storage element then loses the electrostatic charge through its insulating medium. Given the reduction of the electric potential of the programmed charge storage element at a substantially known discharge rate, and by observing the electric potential of the programmed charge storage element at a given point in time, an elapsed time period can be determined. Thus, the time cell is able to measure an elapsed time period without a continuous power source.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or interact with the present invention include a wide variety of data processing technology. Therefore, as background, a typical organization of hardware and software components within a distributed data processing system is described prior to describing the present invention in more detail.

Figure 1A:
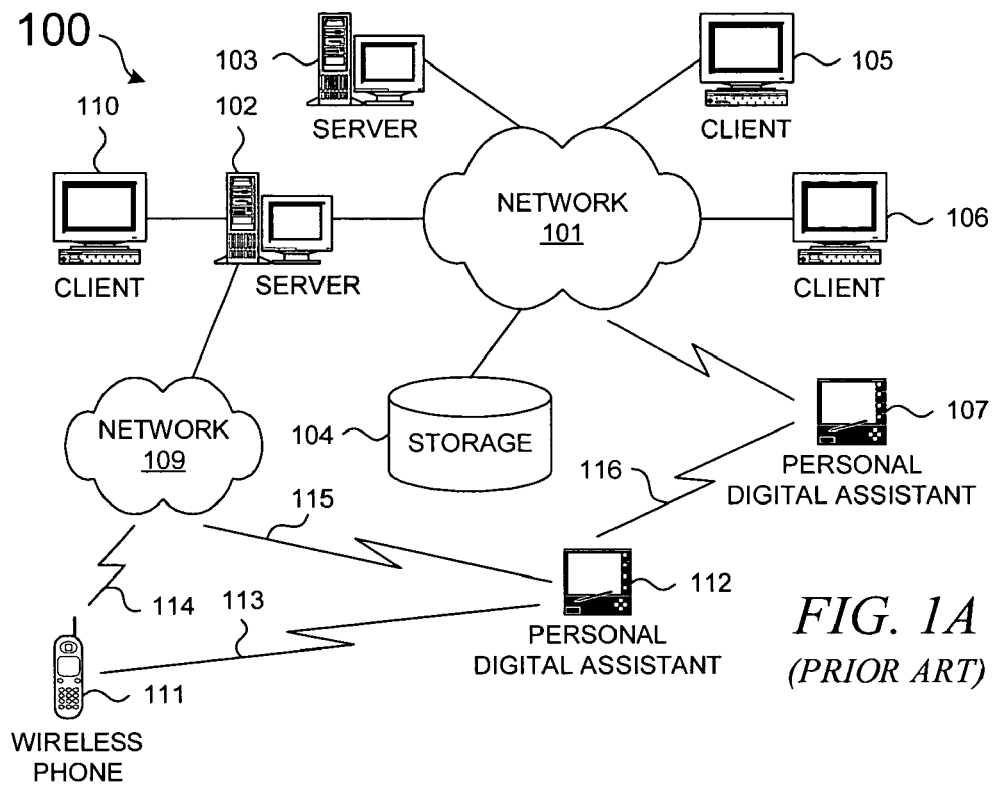
FIG. 1A depicts a typical network of data processing systems, each of which may support a device that comprises the present invention or which may implement the present invention or a portion of the present invention.

With reference now to the figures, FIG. 1A depicts a typical network of data processing systems, each of which may support a device that comprises the present invention or which may implement the present invention or a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports network 109 and client 110; network 109 incorporates wireless communication links. Network-enabled phone 111 and PDA 112 can directly transfer data between themselves across wireless link 113 using an appropriate technology, e.g., via Bluetooth™ wireless technology or Wi-Fi technology (IEEE 802.11) that allows the creation of so-called personal area networks (PAN) or personal ad-hoc networks. Phone 111 connects to network 109 through wireless link 114, and PDA 113 connects to network 109 through wireless link 115. In a similar manner, PDA 113 can transfer data to PDA 107 via wireless link 116.

The present invention could be implemented on a variety of hardware devices and platforms; FIG. 1A is intended as an example of a heterogeneous computing environment and not as an architectural limitation for the present invention.

Figure 1B:
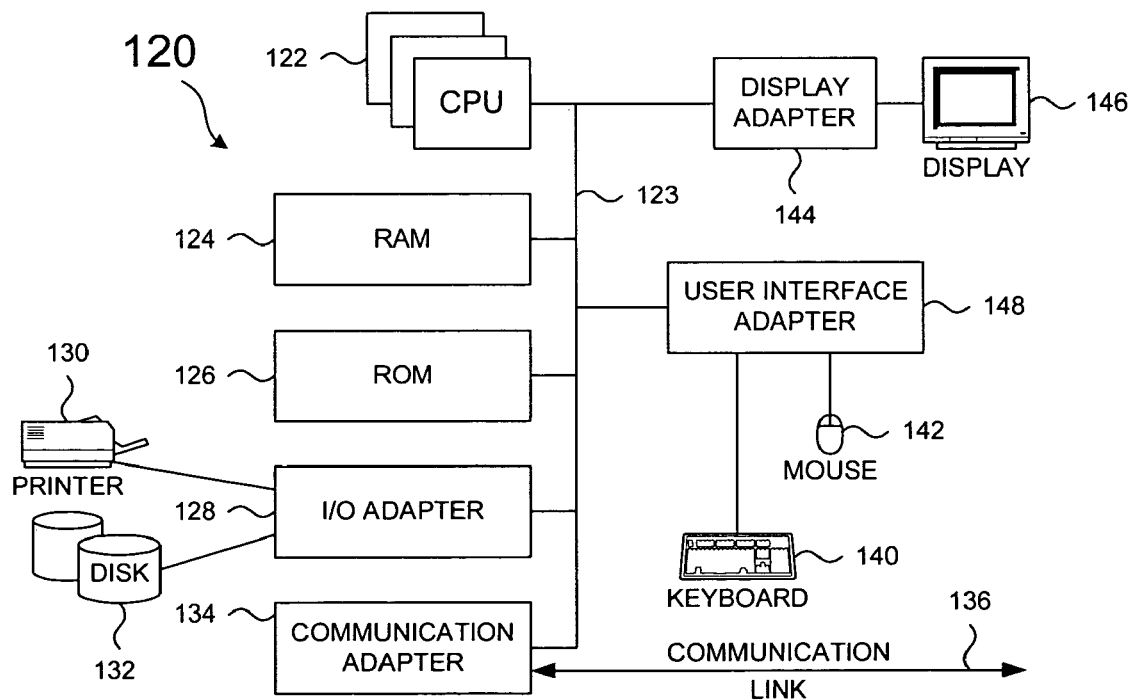
FIG. 1B depicts a typical computer architecture that may be used within a data processing system with which a device that comprises the present invention may interact or in which the present invention or a portion of the present invention may be implemented.

With reference now to FIG. 1B, a diagram depicts a typical computer architecture of a data processing system, such as those shown in FIG. 1A, with which a device that comprises the present invention may interact or in which the present invention or a portion of the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to employing time cells to perform horological functions within commercial transactions, wherein multiple embodiments employ time cells in different ways to capture the multiple advantages that are provided by the unique horological characteristics of a time cell. Various embodiments of the present invention are explained in more detail hereinbelow with respect to the remaining figures.

Introduction to an Insulated, Charge Storage Element Usable as an Horological Device The present invention employs a simple, electronic, horological device. In general, an insulated, charge storage element receives an amount of electrostatic charge through its insulating medium, i.e. the charge storage element is programmed, thereby giving the charge storage element a known electric potential with respect to points outside the insulating medium.

Over a period of time, the charge storage element then loses, discharges, emits, or leaks the electrostatic charge through its insulating medium through some type of physical process, thereby reducing the electric potential of the charge storage element. In other words, the electric potential of the programmed charge storage element is reduced at a substantially known rate through a transport or emission process in which electrostatic charge is removed from the charge storage element. The discharge rate may or may not be linear, although a discharge function that models the discharge process of the charge storage element is substantially known.

At a given point in time, the electric potential of the charge storage element is observed. By knowing the beginning electric potential of the charge storage element, the observed electric potential at the given time, and the charge discharge rate of the charge storage element, an elapsed time period can be determined for a given point in time.

The programming process and the discharge process of the charge storage element may be selectively controlled by varying the geometry, materials, and/or physical construction of the charge storage element. Since the programming process may be a quicker, less precise process than the discharging process, the charge storage element may be designed with a higher priority to controlling the discharging process. In other words, the horological device may be engineered within certain parameters to achieve desired temporal properties for a mathematical discharge function that models the physical discharging process. For instance, it is desirable that the period of time during which a programmed charge storage element discharges should be substantially longer than the period of time required to program the charge storage element.

The charge storage element comprises its insulating medium and its internal medium. Although an insulating medium exhibits relatively poor conduction of electric charge, charge may pass through an insulating medium depending upon certain factors, such as the dielectric constant of the insulating medium (its resistivity) and the width of the insulating medium between the source of the charge and the destination of the charge. Typically, an insulating medium has a higher electrical resistance than adjacent media and generally serves to separate and to isolate adjacent conductors or semiconductors. The insulating medium of the charge storage element substantially surrounds and contains an internal medium capable of bearing an electrostatic charge, i.e. the internal medium cannot be comprised solely of free space. The insulating medium may comprise free space, a gaseous medium, a liquid, a solid, or a combination of these. Although the insulating media substantially surrounds the internal medium, the internal medium does not necessarily occupy the entire space enclosed by the insulating media.

Although the charge storage element is substantially electrically isolated by its insulating medium, the charge storage element may be programmed through its insulating medium in a relatively short period of time using a variety of known physical processes. In general, an insulating material, such as silicon dioxide (glass), is a substance whose conduction band is separated from the valence band by such a large band gap that hardly any electrons can acquire sufficient energy to be lifted into the conduction band. However, certain physical processes may cause very limited transport of electrons through an insulating material. The physical processes by which the internal medium receives or discharges an electrostatic charge through the insulating medium will vary depending upon implementation of the charge storage element.

Insulated Charge Storage Element as Horological Device

Figure 2A:
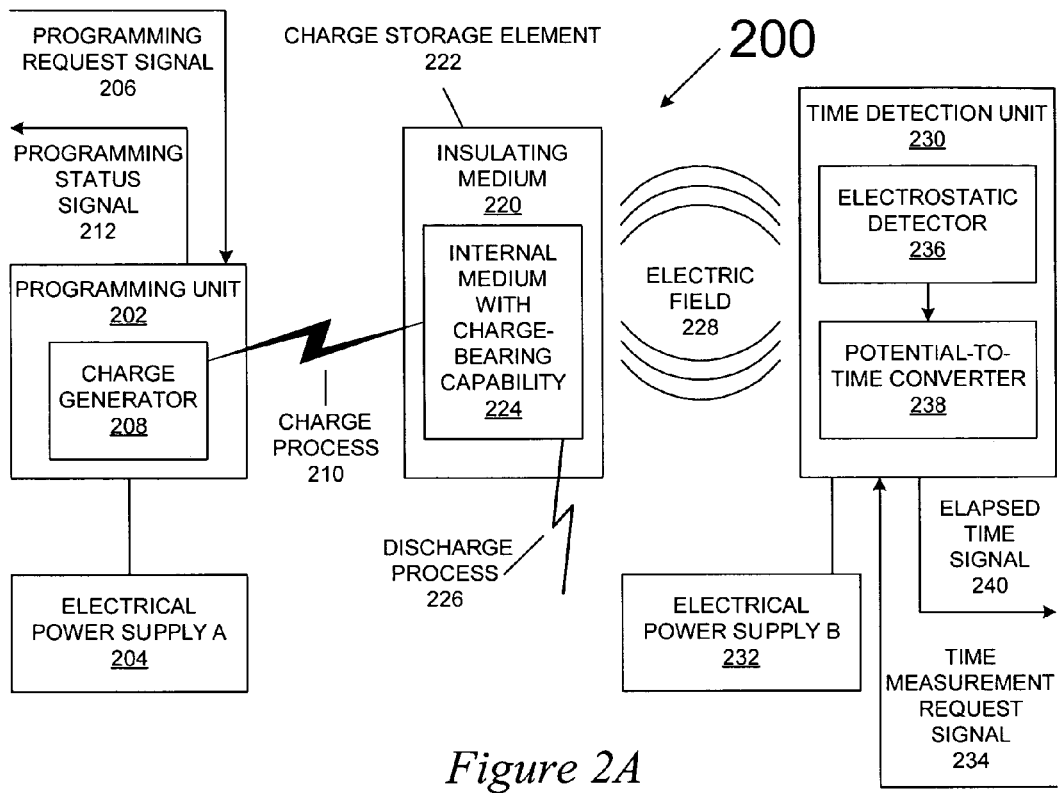
FIG. 2A depicts an insulated charge storage element usable as an horological device.

With reference now to FIG. 2A, a block diagram depicts an insulated charge storage element usable as an horological device. System 200 provides supporting elements, structures, or devices necessary for initializing the horological device at the beginning of a measured time period and for determining an elapsed time period since the initialization.

Programming unit 202 draws electrical power from electrical power supply A 204 for its operation. Programming unit 202 receives programming request signal 206, which instructs programming unit 202 to initialize the charge storage element, after which charge generator 208 uses charge process 210 to direct or inject electric charge into the insulating medium of the charge storage element.

As noted previously, a variety of programming mechanisms and programming times for charging the charge store element may be used, wherein the choice will be dependent on several factors, such as the size and composition of the insulating medium, the geometry of the charge storage element, etc. For example, if the charge storage element is implemented as a floating gate within an floating gate field effect transistor (FGFET), then the charge process may be implemented via channel hot electron injection. For other transistor configurations containing a charge storage element, other charge injection mechanisms may be appropriate. If an entirely different implementation comprises a charge storage element that is not contained within a transistor, then the programming mechanism may comprise an entirely different charge process, such as an electron beam or a laser beam capable of ionizing the internal medium, particularly if the insulating medium of the charge storage element comprises free space.

Programming unit 202 may provide an optional status signal 212 that indicates to the programming requester whether or not the programming operation was successful. In this manner, programming unit 202 may be operated in a synchronous manner. Alternatively, programming unit may operate asynchronously by generating a status signal only during error detection. A variety of mechanisms for communicating with the programming unit should be apparent to one of ordinary skill in the art.

The insulating medium of the charge storage element does not present a complete barrier to charge. Internal medium 224 of charge storage element 222 receives the electric charge through insulating medium 220, thereby giving charge storage element 222 an initial electric potential with respect to other components in system 200. The electrostatic charge stored in the internal medium immediately begins to be discharged through insulating medium 220 by electrostatic discharge process 226; in other words, the insulating medium is not a perfectly insulating medium because it substantially insulates the internal medium while allowing a relatively slight discharge process to occur over time.

Time detection unit 230 draws electrical power from electrical power supply B 232 for its operation. Alternatively, a single electrical power supply could provide all necessary electrical power to system 200.

At some given point in time after charge storage element 222 has been programmed, time detection unit 220 receives time measurement request signal 234. Electrostatic detector 236 within time detection unit 230 determines, either directly or indirectly, a value for the remaining electric potential of charge storage element 222 through electric field 228, which is then converted to an elapsed time value or indication by potential-to-time converter 238. Elapsed time signal 240 is then sent to the device that requested an observation of the charge storage element. The elapsed time indication may have a variety of forms: a timestamp as a digital value that indicates an amount of elapsed time or a form of wall clock time, i.e. a time value that can be converted to universal time; a data value that indicates the elapsed time period as a number of time units since a known event that has occurred at some previous point in time, e.g., the programming event for the charge storage element; a data value, e.g., a binary or boolean data value, that indicates whether or not an elapsed time period since a previous point in time is greater than or equal to a predetermined time period; or some other data value or indicating mechanism.

System 200 may be implemented as multiple devices. The programming unit may be physically coupled to a device containing the charge storage element during its programming operation, after which the programming unit is decoupled. At some later point in time, the time measurement unit may be physically coupled to the device containing the charge storage element during its elapsed time determination, after which the time measurement unit is decoupled. This multi-device, multi-operation environment may occur in an application in which the charge storage element is present in a portable device, such as a simple, externally powered, smart card, PCMCIA (Personal Computer Memory Card International Association) card, or other physical token or article of manufacture. As noted previously, however, the horological device of the present invention may be implemented in a variety of forms depending upon its application, such as a product in which the horological device is embedded.

Figure 2B:
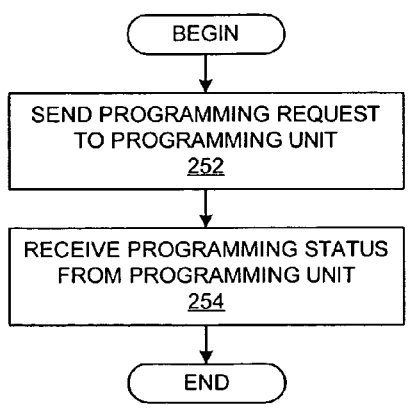
FIGS. 2B–2C depicts flowcharts that show simple processes that may be performed within a computer or electronic device that uses an horological device.
Figure 2C:
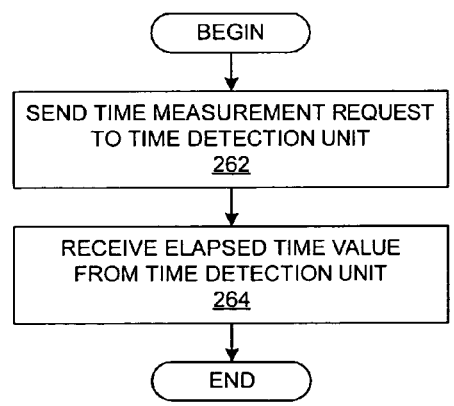

With reference now to FIGS. 2B–2C, flowcharts depict simple processes that may be performed within a computer or electronic device that uses an horological device in accordance with the present invention. The processes depicted in FIGS. 2B–2C may be performed by computer-like hardware or software within a data processing system. In FIG. 2B, the process for initializing the charge storage element begins by sending a programming request to the programming unit (step 252). Optionally, after the programming process is completed, a status signal is then received from the programming unit (step 254). The process is then complete, and the requesting logic may perform other actions.

In FIG. 2C, the process for obtaining a value or observation of an elapsed time period begins by sending a time measurement request to the time detection unit (step 262). An elapsed time value is then received from the time detection unit (step 264). The process is then complete, and the requesting logic may perform other actions. Various methods for sending and receiving data from the programming unit and time detection unit should be apparent to one of ordinary skill in the art. For example, the programming request and the time measurement request may be sent through a simple memory write command if the units are memory addressable.

Introduction to a Time Cell

Non-volatile memory is well known in the art of computer technology; a non-volatile memory apparatus is a memory apparatus that retains data when power is removed from the memory apparatus or from the system containing the memory apparatus. Many different implementations of non-volatile memory are commercially available, and different types of non-volatile memory operate in different manners. Some types of non-volatile memory have charge storage elements, while other types of non-volatile memory do not have charge storage elements. The phrase "to program a non-volatile memory cell" is common in the prior art to describe the manner in which a non-volatile memory cell with a charge storage element receives its charge; channel hot electron injection is one type of programming operation. The term "to program" has been used hereinabove to describe a charging operation with respect to an insulated charge storage element that is used as an horological device.

An insulated, charge storage element, e.g., as discussed above with respect in FIG. 2A, can be implemented in many different forms. One implementation of an insulated, charge storage element is a modified non-volatile memory cell, which is termed a "time cell"; more specifically, a particular embodiment of a time cell comprises a modified non-volatile memory cell that contains a charge storage element. In contrast to a typical non-volatile memory cell in which one attempts to hold a programmed charge as long as possible to accurately represent a programmed memory state, a time cell can be configured or constructed by modifying or configuring the structures of a non-volatile memory cell such that its programmed charge storage element loses, discharges, emits, or leaks its electrostatic charge through its insulating medium in a known, controllable, measurable, manner. The phrase "to program a time cell" is used in the same manner as the phrase "to program a non-volatile memory cell"; in other words, the phrase "to program a time cell" is used to describe the process by which an insulated charge storage element within a time cell receives its charge.

A time cell can be configured or constructed to lose, discharge, emit, or leak a programmed electrostatic charge at a known, controllable, measurable, rate; different time cells can be configured or constructed to lose, discharge, emit, or leak electrostatic charge at different but known, controllable, measurable, rates. A read operation can be performed on a time cell in order to obtain a measurement of the remaining charge within the time cell's charge storage element; in other words, the read operation provides an indirect observation of the electric potential of the charge storage element in the time cell that is caused its retained electrostatic charge. The time cell's structure determines the amount of time that should elapse before the charge storage element loses enough charge to reach a particular electric potential; in other words, by knowing the amount of time that should elapse before the time cell's charge storage element reaches a particular voltage, the read operation can determine whether or not a predetermined time period has elapsed. A predetermined time period that a time cell is configured to measure may be termed the time cell's time period or the time cell's expiration period; a time cell that has reached its expiration period may be termed an expired time cell.

The operational states of a time cell support computational operations using binary logic. A logic circuit that includes a time cell may have a convention that defines an operational state of the time cell as indicating a binary "1" or a binary "0". Under normal operation, a read operation on the time cell provides a binary determination as to whether or not the time cell contains a logical "1" or logical "0". Using a time cell that has been designed to reduce the threshold voltage of its charge storage element to a predetermined value within a predetermined period of time after it has been programmed, a read operation can determine whether or not the predetermined period of time has passed. After the predetermined period of time has passed, the electrostatic charge in the time cell has been substantially discharged, and the time cell no longer usefully measures the passage of time and only indicates that a particular period of time has passed.

By convention, a programmed time cell can represent a logical "1". After a particular time cell is programmed, a read operation on the programmed time cell may return a logical "1". After a predetermined time period has passed, the time cell has lost a predetermined amount of its charge, and the time cell no longer appears to be programmed, after which a read operation on the time cell may return a logical "0". Hence, the expiration of the time period for a programmed time cell can be determined to have passed when a read operation on the time cell returns a logical "0"; more simply, the predetermined time period for a time cell "has expired" if the time cell can be represented as a logical "0" at some point after it has been programmed. Alternatively, by convention, a logical "0" may represent a programmed time cell, and a logical "1" may represent a discharged time cell.

Introduction to a Binary Time Cell

A read operation can be performed on a non-volatile memory cell in order to read the non-volatile memory cell's stored data value, i.e. its stored bit or its stored binary value. Since a time cell can be implemented as a modified non-volatile memory cell, a read operation can be performed on a time cell in a manner similar to performing a read operation on a non-volatile memory cell; hence, a read operation can be performed on a time cell in order to determine the logical state of the time cell's charge storage element. In the case of a time cell, however, the read operation is performed in order to determine whether the time cell has reached its expiration period, i.e. whether an amount of time has passed that is greater than or equal to its predetermined expiration period. A "binary time cell" is defined as a time cell that is constructed or configured to provide a binary "0" data value or a binary "1" data value as a direct result of a read operation on the time cell.

A read operation on a binary time cell occurs in a manner similar to a read operation on a non-volatile memory cell. One can determine whether or not the present electrostatic potential of the charge storage element in the binary time cell is above or below the threshold voltage of the time cell's charge storage element, e.g., the time cell's transistor, by observing whether or not the transistor is turned on by the read voltage. This operation provides an indirect observation of the electric potential of the charge storage element in the time cell and its retained electrostatic charge. By knowing the amount of time that should elapse before the time cell's charge storage element loses enough charge to reach a particular electric potential, or in other words, by knowing the amount of time that should elapse before the time cell's charge storage element reaches a particular threshold voltage, the read operation can determine whether or not a predetermined time period has elapsed. Hence, the state of the binary time cell can read as a binary "0" data value or a binary "1" data value.

It should be noted that a read operation on a transistor in a binary time cell may occur during a period of time in which the read operation could produce an indeterminate result if not properly considered and appropriately compensated. If a read operation is performed when the current threshold voltage of the transistor has almost reached its predetermined value, i.e. when a read operation would almost cause the transistor to turn on, then an indeterminate result could be produced. In order to compensate, appropriate circuitry may be built into the time cell in order to ensure that a determinate result is produced, thereby producing a logical "1" or "0" as an output only when the predetermined time period of the binary time cell has passed. This type of compensation would only contribute an insignificant amount of imprecision into the monitored time period.

Introduction to an Analog Time Cell

Another type of time cell extends the concept of using the floating gate of a floating gate field effect transistor (FGFET) as the insulated charge storage element for an horological device. In this implementation of a time cell, a programming FGFET and a chargeloss-sensing FGFET have a common, expanded floating gate. The programming FGFET is used to program the common floating gate with an amount of electrostatic charge that is greater than the amount of electrostatic charge stored by a typical FGFET. At a given point in time, e.g., during a read operation, the electric potential of the floating gate is then indirectly determined by a chargeloss sensing device with the assistance of the chargeloss-sensing FGFET, and the measurement is converted into an elapsed time value. In effect, the chargeloss-sensing FGFET senses the amount of stored electrostatic charge that is lost over a period of time by the device. The device for this embodiment may be termed a programmable chargeloss-sensing (PCS) floating gate field effect transistor, or simply PCSFET.

The operation of a PCSFET is similar to the operation of a binary time cell. The operation of the PCSFET, though, results in an analog measurement of its state when an elapsed time is to be observed. Although the final, outputted, time value may be in digital form, the state of the PCSFET is initially sensed in an analog manner. For this reason, the PCSFET may be termed an "analog time cell".

One or More Sets of Time Cells Employable within an Horological Device

A set of time cells may be employed within an horological device rather than a single time cell. For example, with a single time cell, a read operation is performed on a time cell that has been designed to reduce its retained electrostatic charge to a predetermined value within a predetermined period of time after it has been programmed, and the read operation can determine the current state of the time cell whether or not the predetermined period of time has passed.

However, with a set of time cells, a set of read operations can be performed on the set of time cells in which each time cell in the set has been designed to reduce the retained electrostatic charge of its charge storage element to a predetermined value within a predetermined period of time after it has been programmed. In other words, each time cell in the set of time cells possesses a different discharge function from the other time cells in the set; the retained electrostatic charge in each time cell in the set decays differently over a different time period from the other time cells. The amount of retained electrostatic charge in the charge storage element of each time cell is observed by performing a read operation on each of the time cells to determine whether the associated time period for each time cell has elapsed. The read operation can determine, from the current state of the time cell, whether or not the predetermined period of time for each time cell has passed, thereby providing granularity for multiple time periods if desired.

In a device in which each time cell contains a floating gate field effect transistor (FET), the thickness of the tunneling oxide in each FGFET can be unique among the set of time cells; each time cell would then experience a unique profile of electron tunneling, giving each floating gate a different charge decay function. As the retained charge of each floating gate diminishes, the threshold voltage of each FGFET will diminish at unique rates.

It should be noted that it is not necessary for each time cell to be constructed in the same manner. For example, the charge storage elements in each time cell in the set of time cells may be different types of charge storage elements, e.g., different types of transistors. If the charge storage elements in the set of time cells are implemented as the same type of transistor, the tunneling regions in each transistor may differ, thereby providing each time cell with different temporal properties.

The discharge functions across a set of time cells may also differ because of varying initial conditions in each time cell. For example, a set of identical time cells may be programmed for different lengths of time, thereby providing each of the time cells with a different initial amount of electrostatic charge and a different ability to measure shorter or longer time periods, although each type of time cell may be constructed differently and also have different programming periods. Continuing the FGFET example, in a device in which each time cell in a set of time cells contains a substantially identical floating gate FET, the programming period for each FGFET can be unique among the set of time cells. Each time cell would then experience a unique profile of electron tunneling, giving each floating gate a different charge decay function. As the retained charge of each floating gate diminishes, the threshold voltage of each FGFET will diminish in a unique fashion.

Figure 3A:
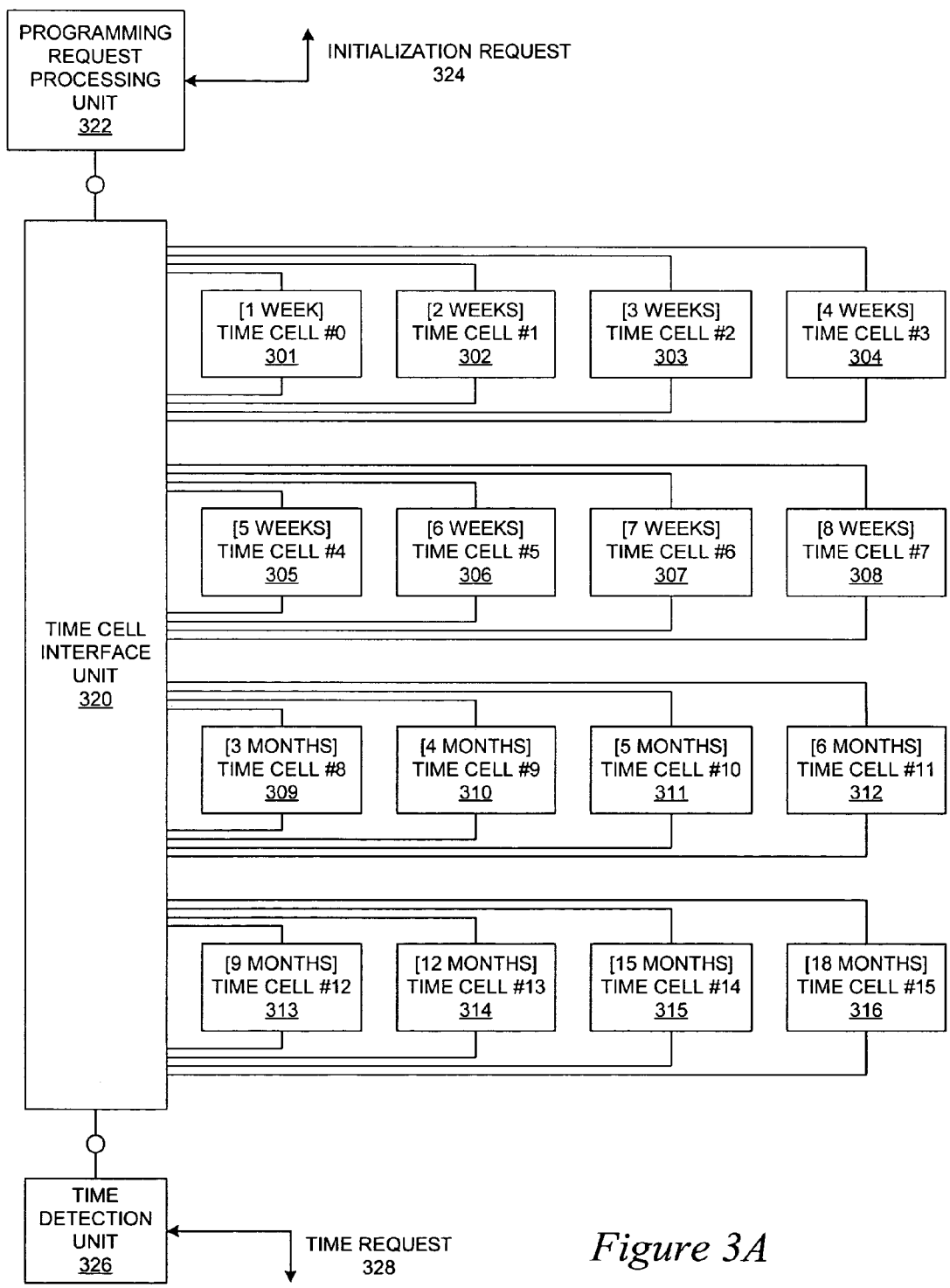
FIG. 3A depicts a block diagram that shows a set of time cells with unique time period measurement.

With reference now to FIG. 3A, a block diagram depicts a set of time cells with unique time period measurement. FIG. 3A shows a set of sixteen time cells 301–316 that are constructed so that each time cell measures a unique period of time. For example, the time cells may be constructed as modified non-volatile memory cells with varying tunnel regions or programming periods.

The time cells can be arranged as M×N arrays of different sizes, and the time cell array may be constructed in accordance with a variety of well-known memory architectures. As described above, the read operation for a time cell may be similar to the read operation for a non-volatile memory cell; hence, the operation of the time cell array may be very similar to the operation of a non-volatile memory. So, for example, the time cells may be arranged such that the time cells operate in byte-like units in which eight time cells are initialized or read in a single operation; the arrangement of a time cell array may vary with different implementations. The specific geometric, dimensional, or physical characteristics of each individual time cell are selected when the device is manufactured. However, the time period measured by any given time cell may be adjusted, within specific ranges, by storing varying amount of electrostatic charge in the time cell.

Time cell interface unit 320 provides the necessary, simple circuitry for addressing time cells 301–316. Time cell interface unit 320 responds to signals from programming request processing unit 322 that indicate that one or more time cells are to be initialized. Programming request processing unit 322 responds to initialization requests 324 from other components in a data processing system.

Time cell interface unit 320 and time cells 301–316 may reside in a physically separable object, such as a simple personal, portable, plastic card, as a portable device like a smart card, or some other manufactured product. In these cases, time cell interface unit 320 obtains electricity for performing initialization or read operations from the device to which it interfaces, i.e. the device that controls the initialization operations or the read operations.

Time cell interface unit 320 also responds to signals from time detection unit 326 that request the time indications of time cells 301–316. Time detection unit 326 may reside on a device that is physically separable from programming request processing unit 322. One or more read operations can determine from the current state of the time cells whether or not predetermined time periods have passed, thereby providing granularity for multiple time periods.

As noted previously, the time period for a programmed time cell can be determined to have expired when a read operation on the time cell returns a logical "0"; more simply, a time cell is an expired time cell if it contains a logical "0" at some point after it has been programmed; as noted previously, though, the logical values that are represented by the condition of a time cell may be reversed by convention. In the example shown in FIG. 3A, all of the sixteen time cells can be read in a single time detection operation, thereby producing sixteen bits of time information. Hence, a 16-bit binary value is able to represent the entire contents of the time cell array, and as explained below, the resulting 16-bit string can represent an elapsed time period since the initialization or the programming of the time cell array. The temporal resolution provided by the 16-bit value is dependent upon the time periods that are measurable by the time cell array.

Referring again to the example time cell array shown in FIG. 3A, it may be assumed that the time cell interface unit returns logical zeroes for expired time cells, and it may also be assumed that the time cell array is read such that the least significant time bit represents the time cell with the shortest time period. A bit string of 0xFFFF (hexadecimal format) represents that it has been less than one week since the entire time cell array was initialized; as an example in which the device has an accuracy of ±1%, time cell 301 can measure a one week time period within a range of plus or minus two hours. A bit string of 0xF800 represents that it has been somewhere between 5 and 6 months since the time cell array was initialized; as an example in which the device has an accuracy of ±1%, time cell 312 can measure a six month time period within a range of plus or minus two days. A bit string of 0x0000 represents that it has been over 18 months since the time cell array was initialized; as an example in which the device has an accuracy of ±1%, time cell 316 can measure an eighteen month time period within a range of plus or minus six days.

Time detection unit 326 may receive requests and may then return time indications in a variety of manners. For example, a time request may consist of a query command that contains a time value, which the time detection unit interprets as a request for a determination of whether or not the elapsed time period for the time cell array is greater than the time value in the query command. If so, the time detection unit returns a boolean value of "true", and if not, then the time detection unit returns a boolean value of "false". Alternatively, the time detection unit can return the bit string that is received from the time cell interface unit if the component that generated the request has knowledge of the time periods represented by the time cell array.

In another alternative, the time detection unit can return a binary value that represents the minimum, verifiable number of seconds that have elapsed since the initialization of the time cell array. For example, if the time cell array contains a current bit string of 0xF800, then the time cell array was initialized somewhere between 5 and 6 months ago; the time detection unit could then return a 32-bit binary value of 0x00C5C100, which is equal to a decimal value of 12,960,000, which is the number of seconds in five months at an average of 30 days per month, thereby returning a value that shows that the time cell array has measured an elapsed time period of at least five months. Many operating systems of data processing systems contain system calls which support the computation of time periods in units of seconds or less, so the original requester may actually desire to have the elapsed time returned in this form for ease of use. The described time period representations should not be interpreted as limiting the present invention in the manner in which elapsed time periods may be reported.

An initialization request or programming request may initiate both an initialization operation for a newly manufactured time cell array and also an erase operation that effectively initializes all of the time cells in the time cell array or a subset of cells in the time cell array. Alternatively, the programming request processing unit may accept separate erase or reset requests. Although, in general, all of the time cells within the time cell array would be initialized at the same time, it is possible to divide the time cell array into subsets of time cells so that multiple elapsed time periods are being measured.

Figure 3B:
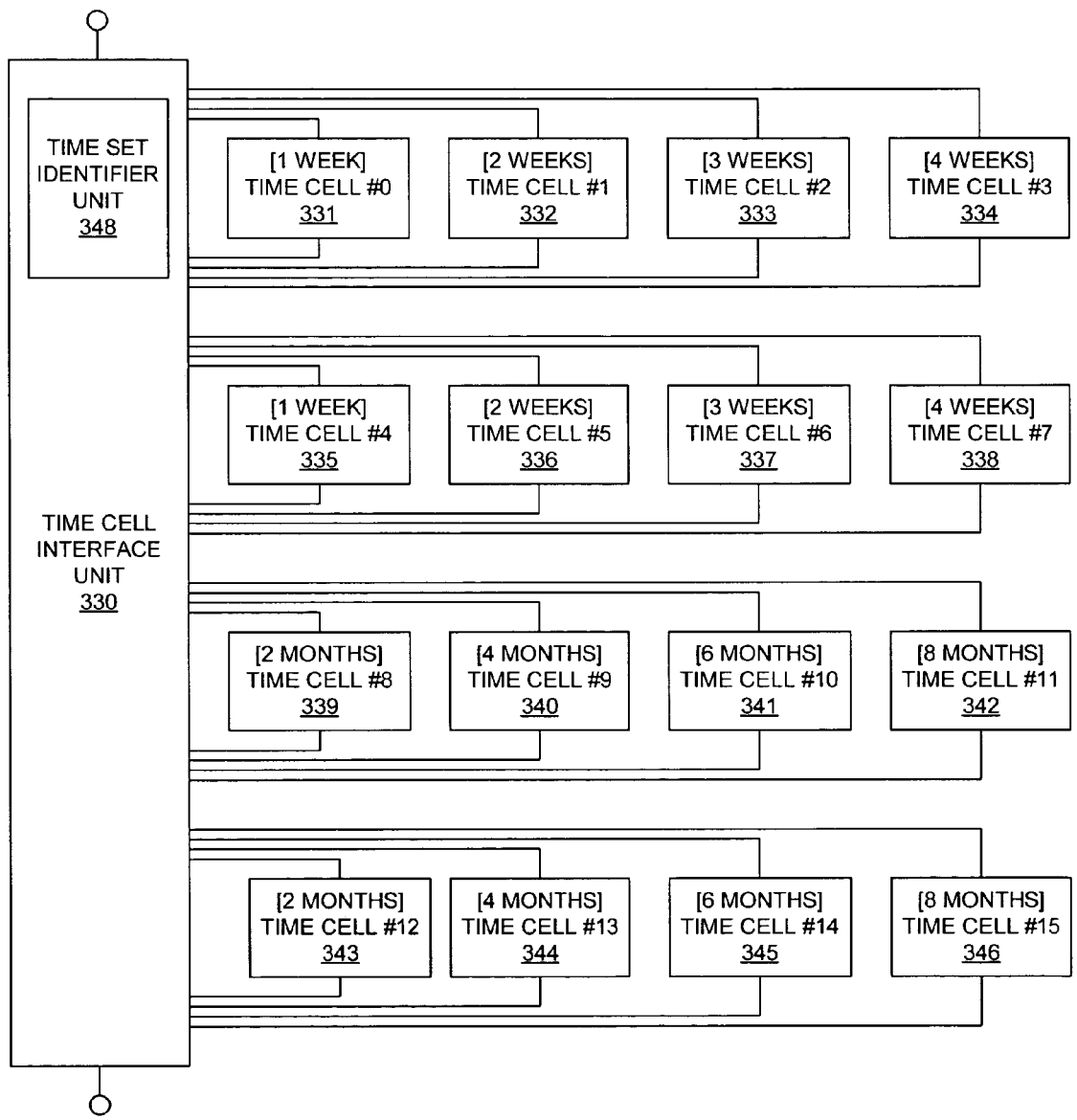
FIG. 3B depicts a block diagram that shows an array of time cells divided into sets of time cells.

With reference now to FIG. 3B, a block diagram depicts an array of time cells divided into sets of time cells. FIG. 3B shows a set of sixteen time cells similar to those shown in FIG. 3A. Time cell interface unit 330 provides the necessary, simple circuitry for addressing time cells 331–346.

The time cells can be arranged as M×N arrays of different sizes. For example, one could divide a time cell array containing sixteen time cells into four sets of four time cells, and the four sets could be constructed such that each set measured different periods of time.

In the example shown in FIG. 3B, time cells 331–334 form a single set in which the set collectively measures a four-week time period in one-week increments. Time cells 335–338 also form a set of time cells in which the set measures a four-week time period in one-week increments. Time cells 339–342 and time cells 343–346 form two sets in which each set collectively measures an eight-month time period in two-month increments.

Each set of four time cells may be initialized by different data processing systems for different purposes at different starting times. The time cell array may monitor a maximum of four different time periods, or four different "time sets", whereas, in general, the maximum number of time sets would depend on the number of time cells in the time cell array and the manner in which the time cells are constructed to measure different time periods. For this type of functionality, time cell interface unit 330 may have other non-volatile memory cells, such as time set identifier unit 348, for storing use indicators that show whether a particular time set is already in use and for storing information that identifies the data processing system that "owns" a particular time set.

Timestamps may also be associatively stored in the non-volatile memory cells in the time set identifier unit so that a sensing device may read the time at which the time set was initialized or initiated. The time set identifier unit may also supply information to the programming request processing unit concerning the time sets available for request.

Figure 3C:
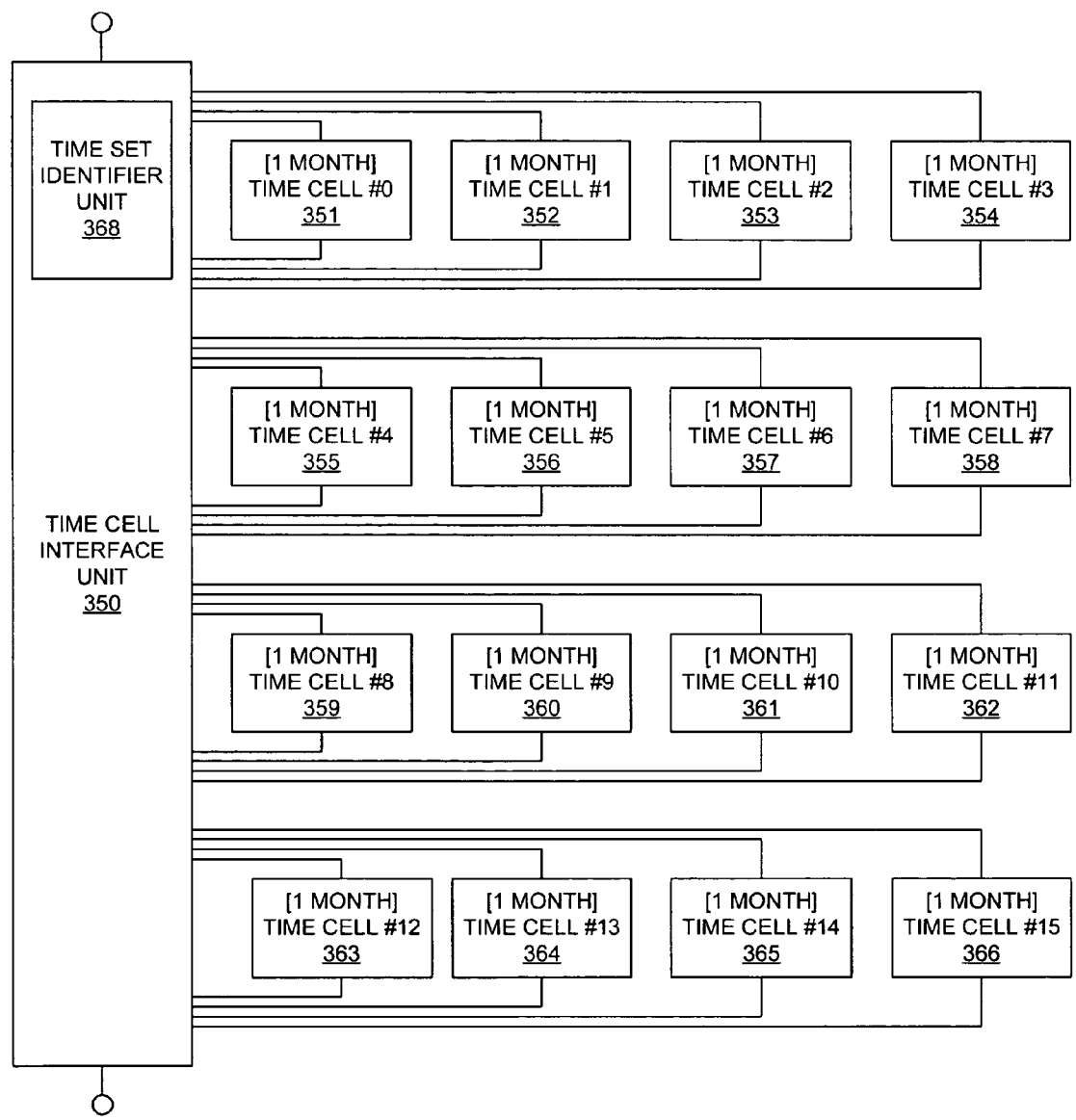
FIG. 3C depicts a block diagram that shows an array of time cells for measuring multiple time periods.

With reference now to FIG. 3C, a block diagram depicts an array of time cells for measuring multiple time periods. FIG. 3C shows a set of sixteen time cells similar to those shown in FIG. 3A. Time cell interface unit 350 provides the necessary circuitry for addressing time cells 351–366. In this example, all of the time cells have identical associated time periods, and a device that contains the time cell array may monitor sixteen concurrently running time periods with different starting times. Again, it should be noted that the time periods associated with a time cell may be set through the construction of the time cell, which gives the time cell its particular physical characteristics, or through the programming period for the time cell, which gives the time cell its electrostatic charge that serves as an initial condition for the time cell's discharge function.

Time set identifier unit 368 may store: use indicators that show whether a particular time cell is already in use; identification information of the data processing system that "owns" a particular time cell; a timestamp associated with the time cell indicating the time at which the time cell's elapsed time period was initiated; and any other information which may be pertinent to the operation of a time cell array and its use.

The time cell array shown in FIG. 3C may also be used in the following manner. The time set identifier unit may set aside time cells 351–354 to monitor a single six-month time period for a single requested time period or time set. Rather than using a single time cell for a requested time period, multiple time cells are used. When a time request is received, the readings from time cells 351–354 are statistically combined to form a determination as to whether the time period has elapsed. For example, a six-month time period is not determined to have elapsed until there are at least two expired time cells. In this manner, the time cells may be viewed as providing a type of redundancy or error-checking in their elapsed time measuring capabilities. Of course, the number of time cells that are used as a redundant set and the number of time cells that are required for a positive determination of an elapsed time may vary.

The redundant use of time cells may also be used in more complex ways. Referring again to FIG. 3B, time cells 335–338 may act as a backup set or error-checking set to time cells 331–338. Each of these sets of time cells can measure a four-week time period in one-week increments, so the time set identifier unit may require that each set of time cells show a minimum elapsed time period before that time period is confirmed. For example, assuming again that the time cell array is read such that the least significant time bit represents the time cell with the shortest time period, the time set identifier unit might require a reading of 0xC from each set of time cells before positively reporting that a two-week time period has elapsed since the two set of time cells were initialized or programmed.

Devices that Include or Use a Time Cell

Figure 3D:
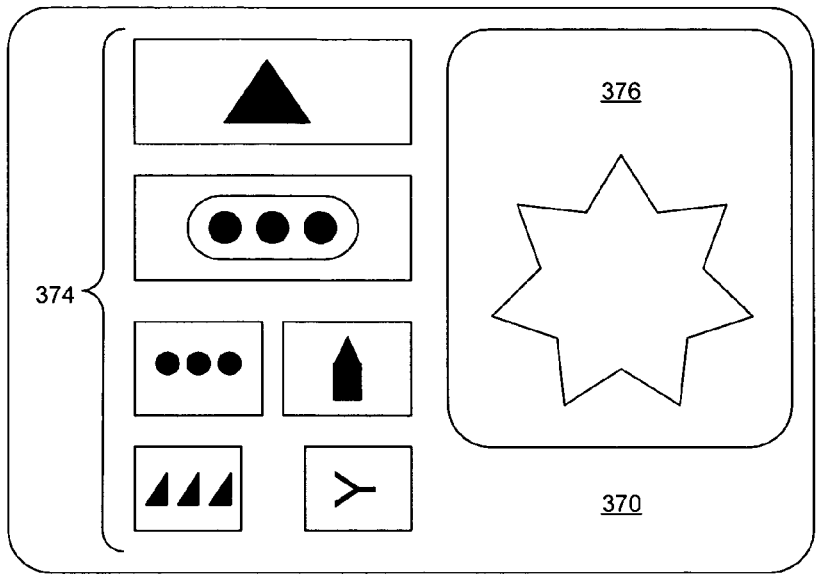
FIG. 3D depicts a graphical depiction for a smart card that may be used in conjunction with a time cell.

With reference now to FIG. 3D, a graphical depiction is provided for a smart card that may be used in conjunction with a time cell. Smart card 370 includes input control buttons 374, and electronic display 376. Buttons 374 may be used by a purchaser or owner of the smart card for inputting and selecting specific functions provided by an application operating on the smart card.

Display 376 presents information to the user of the smart card generated by applications within the smart card, possibly in conjunction with a device or data processing system to which the smart card is coupled or in which the smart card is inserted. Alternatively, smart card 370 does not have a display, but a user may operate a reader device that couples to the smart card and interacts with the smart card, and the user can view optional functions and selections on the display of the reader device. In either case, a user can be provided with textual and/or graphical indicators on the display of a device that indicate the status of one or more time cells on the physical token containing the time cells.

Figure 3E:
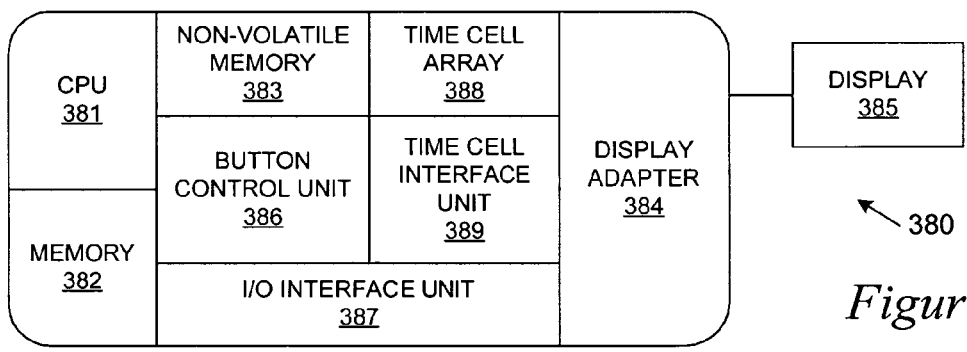
FIG. 3E depicts a block diagram that shows the hardware components within a smart card that may be used in conjunction with a time cell array.

With reference now to FIG. 3E, a block diagram depicts the hardware components within a smart card that may be used in conjunction with a time cell array. Smart card 380 shows the typical internal hardware components of a smart card, such as smart card 370 shown in FIG. 3D. Smart card 380 contains a CPU 381 that provides processing capabilities to various applications located on smart card 380. Memory 382 provides temporary storage for the loading and processing of data. Non-volatile memory 383 provides permanent storage for applications and their related databases. Display adapter 384 generates presentation data to be shown on display 385. Button control unit 386 reads and processes user selections of buttons on the physical interface of smart card 380. I/O interface unit 387 allows smart card 380 to interface with various card readers, scanners, modems, or other computer or network-related items.

Button control unit 386 allows a user to input various selections and data to applications on smart card 380. Additional input devices may be included with or interfaced to smart card 380. Display 385 may be physically integrated with smart card 380, although other display units may be connected to smart card 380. Non-volatile memory 383 may include a variety of storage devices and capabilities, such as read-only memory, flash ROM, or an IBM MicroDrive, a product of International Business Machines Corporation, located in Armonk, N.Y. Smart card 380 may also include a Java™ Virtual Machine capable of running Java applications and applets. Those of ordinary skill of the art will appreciate that the hardware in FIG. 3E may vary depending on various implementation considerations. For example, it should be noted that the electronics within smart card 380 may be implemented on a single chip. In addition, other types of physical tokens could be used in place of a smart card, such as a PCMCIA card, flash memory cards, and various types of articles of manufacture.

Smart card 370 or smart card 380 also contains a batteryless, oscillatorless horological device in accordance with the present invention. Time cell array 388 is controlled by time cell interface unit 389 for measuring time periods in a manner similar to one or more methods that were described above with respect to FIGS. 3A–3C. Alternatively, the smart card may contain a single time cell. The complexity of the timekeeping requirements for the smart card applications may determine the type of time cell configuration for one or more application-specific purposes.

Smart card 380 may be coupled to a device which contains a programming request processing unit and a time detection unit, or smart card 380 may be coupled to separate devices at different times.

Figure 3F:
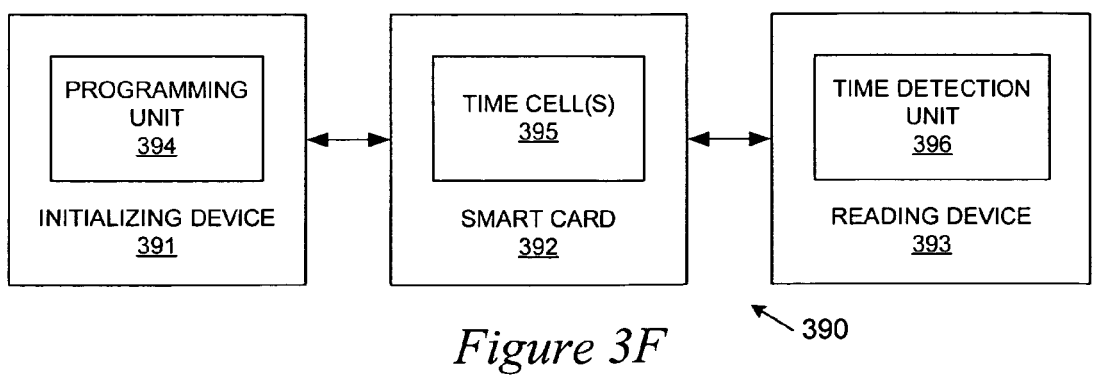
FIG. 3F depicts a block diagram that shows a relationship between a programming device, a sensing device, and an horological device.

With reference now to FIG. 3F, a block diagram depicts a relationship between a programming device, a sensing device, and an horological device. The horological device contains one or more time cells similar to that described above with respect to FIGS. 3A–3C.

System 390 shows initializing device 391 connected to batteryless, oscillatorless, electronic smart card device 392, which in turn is connected to reading device 393. While it is possible that all of these devices are located within the same system, depending upon the application, each of these devices may be physically located within a different system, product, component, or other device, all of which may be networked together in some manner. For example, the batteryless smart card may be initialized by an issuing institution using initializing device 391. A consumer may carry the smart card while it is monitoring an elapsed time period and then may present the smart card to a merchant. A merchant's data processing system that contains reading device 393 may then determine the smart card's elapsed time period for a variety of business reasons.

Much of the programming device circuitry and reading device circuitry may be implemented on smart card 392. However, additional circuitry adds to the cost of manufacture of the smart card, and there may be other commercial considerations. Although the smart card may contain this additional circuitry, it should be understood that the time cell is still directed to powerless or batteryless operation. For example, the smart card could contain a programming or initializing circuit, one or more time cells, and a reading or sensing circuit, in which case the programming and sensing circuits may draw electricity from a power source external to the smart card.

Initializing device 391 contains programming unit 394 which receives programming commands and sends status about the programming operations (not shown). Programming unit 394 controls the programming operation of time cells 395. Once the programming operation is complete, the time cell discharges its stored charge over time.

At a subsequent point in time, smart card 392 is coupled to reading device 393, in which time detection unit 396 determines the current threshold voltage(s) of the time cell(s), as was described above, and returns the elapsed time corresponding to the current threshold voltage in some manner or returned to the requester.

Figure 4A:
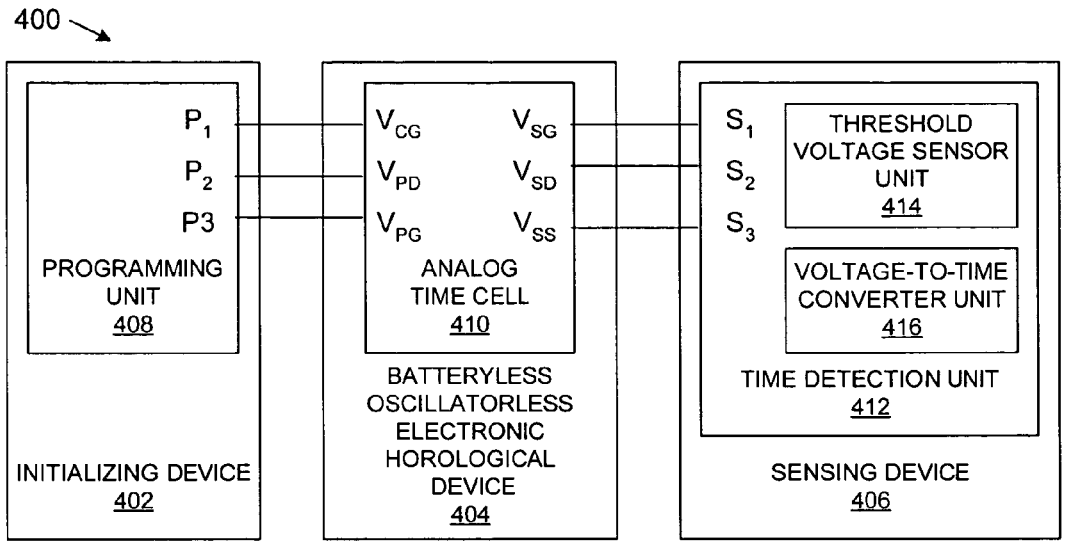
FIGS. 4A–4B depict block diagrams that show a relationship between a programming device, a sensing device, and an horological device with respect to an analog time cell.
Figure 4B:
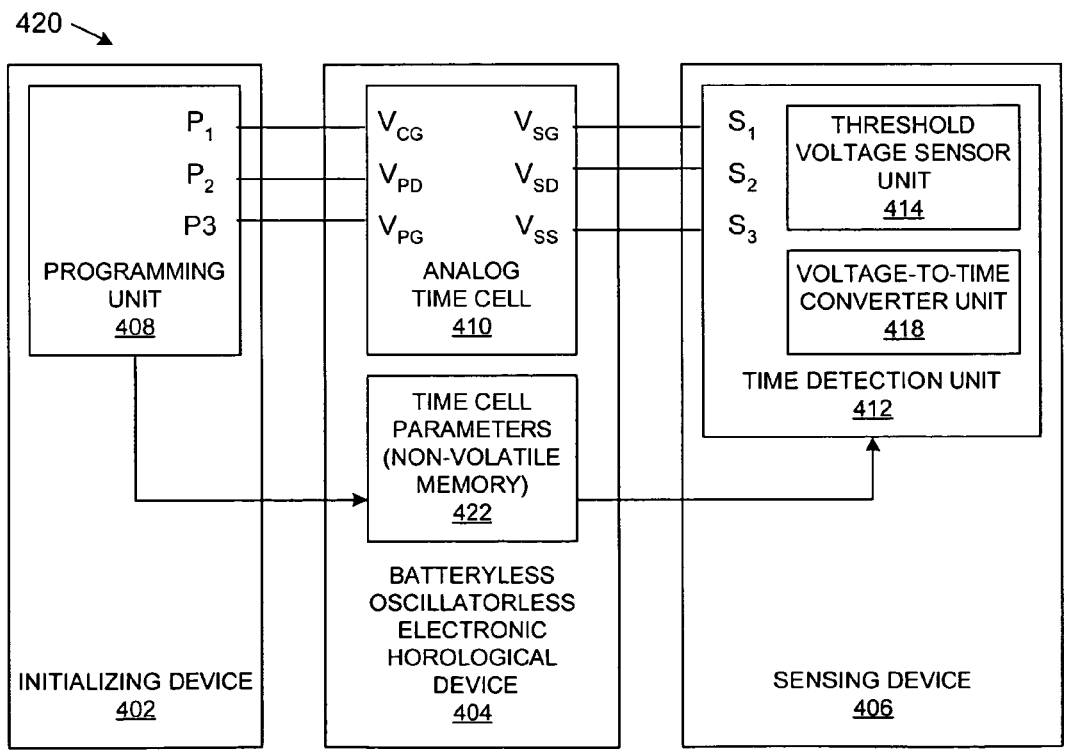

With reference now to FIGS. 4A–4B, block diagrams depict a relationship between a programming device, a sensing device, and an horological device with respect to an analog time cell. In the examples that are illustrated, the horological device contains a PCSFET, which is a combination of a programming FGFET and a sensing FGFET similar to that described above.

System 400 shows initializing device 402 connected to batteryless, oscillatorless, electronic horological device 404, which in turn is connected to sensing device 406. While it is possible that all of these devices are located within the same system, depending upon the application, each of these devices may be physically located within a different system, product, component, or other device. For example, the horological device may be located within a batteryless smart card that is initialized by an issuing institution using the initializing device. A consumer may carry the smart card while it is monitoring an elapsed time period and then may present the smart card to a merchant. A merchant's data processing system that contains a sensing device may then determine the smart card's elapsed time period for a variety of business reasons.

Initializing device 402 contains programming unit 408 which receives programming commands and sends status about the programming operations (not shown). Programming unit 408 controls the programming operation by asserting programming voltages $P_1$, $P_2$, and $P_3$, which are received as voltages $V_{CG}$, $V_{PD}$, and $V_{PG}$ by analog time cell 400. The analog time cell contains a combination of a programming FGFET and a sensing FGFET with a common floating gate which receives a charge during the programming operation. Once the programming operation is complete, the analog time cell discharges its stored charge over time.

At a subsequent point in time, the horological device that contains analog time cell 410 is coupled to sensing device 406, which has voltages $S_1$, $S_2$, and $S_3$ that tie into the chargeloss-sensing FGFET terminals $V_{SG}$, $V_{SD}$, and $V_{SS}$. Sensing device 406 may then initiate the sensing operation or may wait for an elapsed time request command. As the charge in the floating gate of the time cell diminishes over time, the threshold voltage response of the sensing FGFET also diminishes. Time detection unit 412 controls threshold voltage sensor unit 414, which indirectly determines the current threshold voltage of the time cell, possibly using a threshold voltage detection circuit. The estimated amount of elapsed time that corresponds to the determined threshold voltage is then computed by voltage-to-time converter unit 416, and the elapsed time is then processed in some manner or returned to the requester. A variety of forms may be used to report the elapsed time value, such as a timestamp, a number of elapsed seconds or other time units, or a simple boolean value indicating whether the elapsed time is greater than a selected time value.

FIG. 4B is similar to FIG. 4A. FIG. 4B shows system 420 that is similar to system 400 in FIG. 4A with identical reference numerals associated with identical elements. FIG. 4B also includes optional time cell parameter memory 422 on the horological device.

The current state of the analog time cell can be mapped to an elapsed time when the time observation is made. In order to perform the computation properly, the voltage-to-time converter unit has knowledge about the operational capabilities of the time cell, such as its decay or discharge function and the initial amount of charge stored into the common floating gate during the programming operation, or equivalently, the threshold voltage decay function and the initial threshold voltage. Since the amount of charge does not change the form of the decay function but does change the initial condition or starting point of the decay function, the initial threshold voltage is known along with parameters describing the time cell's decay function.

There are many ways in which the sensing or reading device can obtain the information that is required for determining an elapsed time. First, the analog time cell and its programming operation may be standardized such that the sensing device can assume that an analog time cell was manufactured with a particular design and programmed in a particular manner for a particular amount of time. In this scenario, the sensing device directly converts an observed threshold voltage value to an elapsed time. The sensing device can be built to convert values without reference to stored parameters that are unique to a particular time cell.

Second, after the analog time cell is initialized, the programming device stores the initialization information into an accessible database, which the sensing device reads to get information that is correlated with its observations. The initialization information might include the amount of time for which the time cell was programmed and a lookup table that correlates programming times to elapsed times for a given type of time call.

Third, rather than expect the sensing device to have such information available, which implies that the programming device and the sensing device are networked in some way, the operational parameters are stored into time cell parameter non-volatile memory 420 by the programming unit during the programming operation. Since the operational parameters are few and require a small amount of inexpensive, non-volatile memory, these parameter values can be stored quite easily. The parameters may include one or more of the following data items: a timestamp consisting of the time at which the programming operation was complete; an identifier of the manufacturer of the time cell; an identifier of the type of time cell; an identifier of an industry standard to which the time cell adheres; a lookup table correlating an observed threshold voltage with a number of units of time (if the sensing circuit is not on the same device as the time cell); a lookup table correlating an observed detection circuit output value with a number of units of time (if the sensing or detection circuit is on the same device as the time cell); and an identifier of the type of time units stored in the parameter memory. Of course, other operational parameters may be stored in association with the time cells. The format of the parameters themselves may adhere to a standard such that different manufacturers of these devices can ensure interoperability.

It should be noted that the concept of employing multiple time cells as an horological device, as explained above for binary time cells, is also applicable to analog time cells. In this embodiment, a set of sensing operations are performed on a set of analog time cells in which each analog time cell in the set has been designed to reduce the threshold voltage of its PCSFET to a predetermined value within a predetermined period of time after it has been programmed. Using an indirect observation of the threshold voltage of each analog time cell, an elapsed time value can be determined for each analog time cell.

Each analog time cell in the set of time cells may possess a unique discharge function from the other time cells in the set. Alternatively, all of the analog time cells in the set of time cells may possess identical discharge functions. It should be noted that it is not necessary for each time cell to be constructed in the same manner, and the discharge functions across a set of time cells may also differ because of varying initial conditions in each time cell. For example, a set of identical analog time cells may be programmed for different lengths of time, thereby providing each of the time cells with a different initial amount of charge and a different ability to measure shorter or longer time periods.

Multiple analog time cells may be employed within a single horological device for a variety of reasons. As one example, the time cells may be viewed as providing a type of redundancy or error-checking in their elapsed time measuring capabilities. The computed elapsed time values from each analog time cell may be statistically combined, e.g., averaged, in order to obtain a final, reported elapsed time value for the horological device. The number of time cells that are used as a redundant set and the number of time cells that are required for a positive determination of an elapsed time may vary.

As another example, each analog time cell may be programmed or initialized by different data processing systems for different purposes at different starting times. A time cell array may monitor different time periods, or different "time sets". The maximum number of time sets would depend on the number of analog time cells in the time cell array and the manner in which the time cells are constructed to measure different time periods. The horological device may also store use indicators that show whether a particular time set is already in use and for storing information that identifies the data processing system that "owns" a particular time set.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An horological device comprising:
    a floating gate field effect transistor (FGFET), wherein the FGFET has a substantially discharged state before a programming operation and has a controlled discharge state after the programming operation, and wherein the FGFET transitions after the programming operation from the controlled discharge state to the substantially discharged state within a predetermined time period after the programming operation; and
    a conductive lead connected to the FGFET to allow reading a state of the FGFET, wherein a voltage at a source of the FGFET or at a drain of the FGFET during a read operation indicates whether or not the predetermined time period has elapsed after the programming operation.

2. A method for measuring time comprising:
    discharging a floating gate in a floating gate field effect transistor (FGFET), wherein the FGFET comprises the floating gate and an insulating region of insulating material adjacent to the floating gate, wherein a discharge process discharges electrostatic charge that is stored within the floating gate through the insulating region, and wherein the thickness of the insulating region has been manufactured to cause a threshold voltage of the FGFET to reach a predetermined threshold voltage within a predetermined time period after storing the electrostatic charge within the floating gate; and
    performing a read operation on the FGFET to determine whether or not the predetermined time period has elapsed after storing the electrostatic charge within the floating gate, wherein a voltage at a source of the FGFET or at a drain of the FGFET during a read operation indicates whether or not the predetermined time period has elapsed.

3. A computer program product on a computer readable medium for use in a data processing system for measuring time with an horological device, the computer program product comprising:
    instructions for receiving a time measurement request for the horological device, wherein the horological device includes a floating gate in a floating gate field effect transistor (FGFET), wherein the FGFET comprises the floating gate and an insulating region of insulating material adjacent to the floating gate, wherein a discharge process discharges electrostatic charge that is stored within the floating gate through the insulating region, and wherein the thickness of the insulating region has been manufactured to cause a threshold voltage of the FGFET to reach a predetermined threshold voltage within a predetermined time period after storing the electrostatic charge within the floating gate; and
    instructions for performing a read operation on the FGFET to determine whether or not the predetermined time period has elapsed after storing the electrostatic charge within the floating gate, wherein a voltage at a source of the FGFET or at a drain of the FGFET during a read operation indicates whether or not the predetermined time period has elapsed.

4. An horological device comprising:
    an internal medium for storing an electrostatic charge;
    an insulating medium for insulating the internal medium, the internal medium and the insulating medium forming a charge storage element,
        wherein the insulating medium substantially surrounds the internal medium;
        wherein the insulating medium has physical properties that allow a charging process for charging the internal medium with an electrostatic charge through the insulating medium;
        wherein the insulating medium has physical properties that allow a discharge process for discharging a stored electrostatic charge from the internal medium through the insulating medium;
        wherein the insulating medium has one or more physical properties that affect a rate of discharge in the discharge process; and wherein at least one physical property of the insulating medium has been selected so that the discharge process discharges a portion of the stored electrostatic charge within a predetermined time period; and
a conductive lead electrically coupled to the insulating medium wherein a voltage on the conductive lead during a read operation indicates whether or not the predetermined time period has elapsed after the charging process.

5. An horological device comprising:
a first floating gate field effect transistor (FGFET), wherein the first FGFET comprises a first source, a first drain, and a floating gate with an insulating region of insulating material adjacent to the floating gate;
a second FGFET, wherein the second FGFET comprises a second source, a second drain, and the floating gate such that the second FGFET shares the floating gate with the first FGFET, wherein a first portion of the floating gate is proximally located near the first source and the first drain and a second portion of the floating gate is proximally located near the second source and the second drain, wherein a discharge process discharges electrostatic charge that is stored within the floating gate through the insulating region, and wherein the thickness of the insulating region has been manufactured to cause a threshold voltage of the second FGFET to reach a predetermined threshold voltage within a predetermined time period after storing the electrostatic charge within the floating gate; and
conductive leads connected to the second FGFET to allow reading a state of the second FGFET.

6. The horological device of claim 5 wherein a voltage on a conductive lead at a source of the second FGFET or at a drain of the second FGFET during a read operation indicates whether or not the predetermined time period has elapsed after storing the electrostatic charge within the floating gate.

7. The horological device of claim 5 wherein a voltage on a conductive lead at a source of the second FGFET or at a drain of the second FGFET during a read operation is related to the threshold voltage of the second FGFET during the read operation.

8. The horological device of claim 5 further comprising:
means for comparing a voltage on a conductive lead at a source of the second FGFET or at a drain of the second FGFET during a read operation to a reference voltage in order to indirectly determine an elapsed time period after storing the electrostatic charge within the floating gate.

9. The horological device of claim 5 wherein the first FGFET comprises a first control gate and the second FGFET comprises a second control gate.

10. The horological device of claim 9 further comprising:
a coupling gate, wherein the coupling gate is employed to assist in storage of the electrostatic charge within the floating gate.

11. The horological device of claim 5 further comprising:
a coupling gate, wherein the coupling gate is employed to assist in storage of the electrostatic charge within the floating gate.

12. The horological device of claim 5 further comprising:
conductive leads connected to the first FGFET to assist in controlling storage of the electrostatic charge within the floating gate.

13. A method for measuring time comprising:
discharging a floating gate through an insulating region of insulating material adjacent to the floating gate, wherein the floating gate is shared between a first floating gate field effect transistor (FGFET) and a second FGFET, wherein the first FGFET comprises a first source and a first drain, wherein the second FGFET comprises a second source and a second drain, wherein a first portion of the floating gate is proximally located near the first source and the first drain and a second portion of the floating gate is proximally located near the second source and the second drain, wherein a discharge process discharges electrostatic charge that is stored within the floating gate through the insulating region, and wherein the thickness of the insulating region has been manufactured to cause a threshold voltage of the second FGFET to reach a predetermined threshold voltage within a predetermined time period after storing the electrostatic charge within the floating gate;
performing a read operation on the second FGFET to determine whether or not the predetermined time period has elapsed after storing the electrostatic charge within the floating gate.

14. The method of claim 13 comprising:
comparing a voltage on a conductive lead at a source of the second FGFET or at a drain of the second FGFET during a read operation to a reference voltage in order to indirectly determine an elapsed time period after storing the electrostatic charge within the floating gate.

15. The method of claim 13 comprising:
performing a write operation on the first FGFET to store the electrostatic charge within the floating gate.

16. The method of claim 13 comprising:
employing a coupling gate to assist in storage of the electrostatic charge within the floating gate.

17. A computer program product on a computer readable medium for use in a data processing system for measuring time with an horological device, the computer program product comprising:
instructions for receiving a time measurement request for the horological device, wherein the horological device includes a floating gate that discharges electrostatic charge that is stored within the floating gate through an insulating region of insulating material adjacent to the floating gate, wherein the floating gate is shared between a first floating gate field effect transistor (FGFET) and a second FGFET, wherein the first FGFET comprises a first source and a first drain, wherein the second FGFET comprises a second source and a second drain, wherein a first portion of the floating gate is proximally located near the first source and the first drain and a second portion of the floating gate is proximally located near the second source and the second drain, and wherein the thickness of the insulating region has been manufactured to cause a threshold voltage of the second FGFET to reach a predetermined threshold voltage within a predetermined time period after storing the electrostatic charge within the floating gate;
instructions for performing a read operation on the second FGFET to determine whether or not the predetermined time period has elapsed after storing the electrostatic charge within the floating gate.

18. The computer program product of claim 17 comprising:
instructions for comparing a voltage on a conductive lead at a source of the second FGFET or at a drain of the second FGFET during a read operation to a reference voltage in order to indirectly determine an elapsed time period after storing the electrostatic charge within the floating gate.

19. The computer program product of claim 17 comprising:
  instructions for performing a write operation on the first FGFET to store the electrostatic charge within the floating gate.

20. The computer program product of claim 17 comprising:
  instructions for employing a coupling gate to assist in storage of the electrostatic charge within the floating gate.

* * * * *